Figure 1:
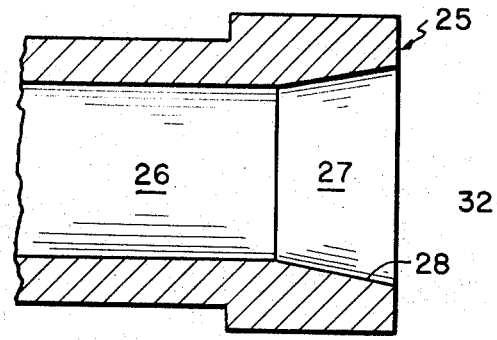

United States Patent
Davis, Jr.

[15] 3,698,231
[45] Oct. 17, 1972

[54] FASTENING TOOLS

[72] Inventor: Samuel B. Davis, Jr., New Galilee, Pa.

[73] Assignee: Vits Maschinenbau GmbH, Langenfeld (Rhineland), Germany

[22] Filed: April 22, 1971

[21] Appl. No.: 136,346

[52] U.S. Cl. ................................72/391, 29/243.52
[51] Int. Cl. ..........................B21d 9/05, B23p 11/00
[58] Field of Search...29/409, 420, 283, 253, 243.52; 85/7; 72/391

[56] References Cited

UNITED STATES PATENTS 3,203,300   8/1965   Marschner.......................85/7
3,215,024   11/1965  Brilmyer et al..................85/7
3,483,788   12/1969  Keeler............................85/7
3,543,560   12/1970  Harris...........................72/391

*Primary Examiner*—Othell M. Simpson
*Attorney*—Webb, Burden, Robinson & Webb

[57] ABSTRACT

A crimp lock fastener tool for joining a swageable collar to a threaded lockbolt includes a stationary housing and a floating split collet which swages the collar to the threads of the lockbolt and severs the remainder of the lockbolt at a point adjacent the collar. The swaging and simultaneous shearing results from the interaction of the inclined surfaces of the stationary housing and the split collet.

5 Claims, 7 Drawing Figures

PATENTED OCT 17 1972 3,698,231

INVENTOR.
Samuel B. Davis, Jr.
BY
Webb Burden Robinson & Webb
HIS ATTORNEYS

FASTENING TOOLS

My invention relates to a fastener tool and, more particularly, to a crimp lock fastener tool for joining a swageable collar to a lockbolt having a threaded shank.

It is presently known to join a swageable collar onto a lockbolt to secure workpieces therebetween. This is accomplished in several ways, one of which is to apply a tensile force to the bolt which indirectly exerts pressure onto the collar to flow the metal of the collar into the grooves of the bolt. Thereafter, the bolt is broken under tension at a pre-established, weakened section along the bolt. Different bolts are required for different thickness workpieces since the location of the weakened section is a function thereof. It is also known to employ a cutting tool for blind rivets which has a rotary movement about the shaft of the rivet to ultimately shear the rivet at the designated area.

My locking tool greatly simplifies the independent swaging and shearing operations by combining them into a continuous, almost simultaneous operation. Further, my invention permits a given length lockbolt to be used over a wide range of required workpiece sizes since no pre-established, weakened section need be incorporated into the lockbolt. Further, my invention simplifies the crimping or swaging of the collar about the lockbolt and is amenable to a number of different preloads on the bolt.

My invention is a crimp lock fastener tool which, as the result of a tensile pull, combines a swaging and cutting action to join a swageable collar to the shaft of a lockbolt and shear the lockbolt at a point immediately adjacent the collar. This is accomplished by means of a floating split collet freely positioned within a stationary housing in which the interaction of their respective inclined surfaces causes a swaging and shearing action. The tensile pull is exerted on a drawbar which coacts with a chuck jaw gripping the shaft of the lockbolt.

Figure 2:
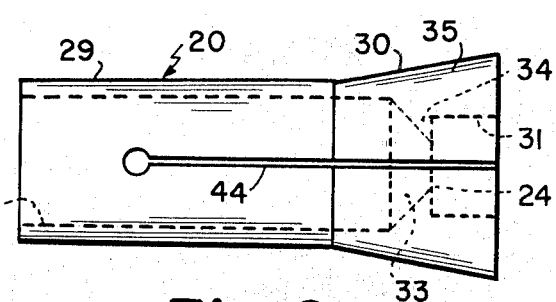
Figure 3:
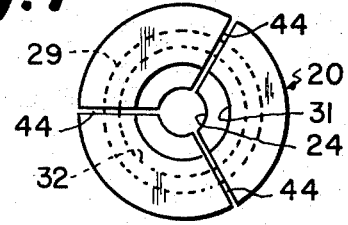
Figure 4:
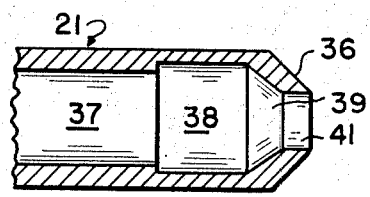
Figure 5:
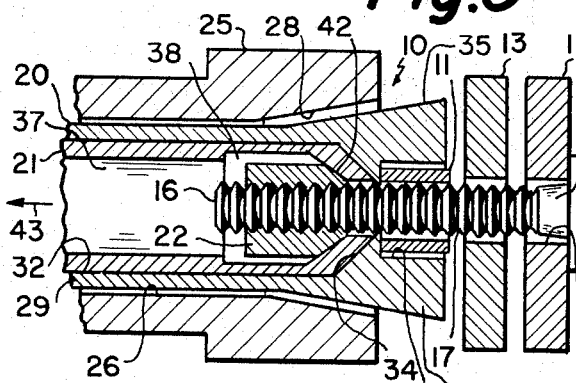
Figure 6:
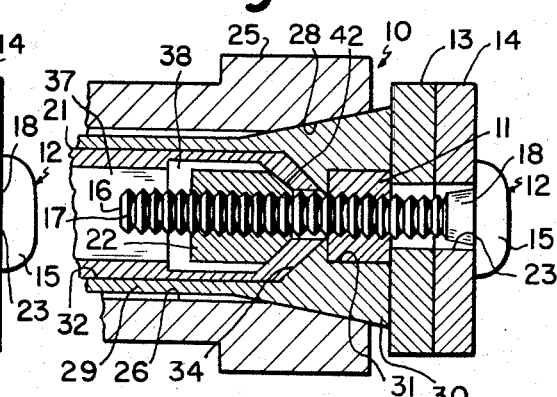
Figure 7:
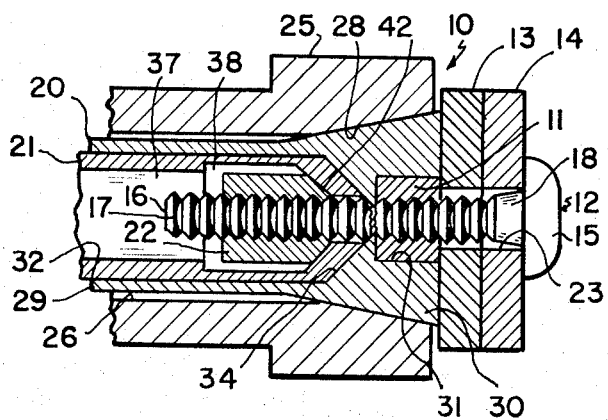

In the accompanying drawings, I have shown one preferred embodiment of my invention in which:

FIG. 1 is a section of the stationary housing;
FIG. 2 is an elevation of the split collet;
FIG. 3 is an end view of the collet of FIG. 2;
FIG. 4 is a section of a portion of the drawbar;
FIG. 5 is a section showing my fastener tool in position before operation;
FIG. 6 is a section showing my fastener tool during operation; and
FIG. 7 is a section of my fastener tool after the lockbolt has been sheared.

My fastener tool, generally designated 10, is used to secure a swageable collar 11 to a lockbolt 12 to join two workpieces such as panels 13 and 14 together. The lockbolt 12 has the normal enlarged head end 15 and a shank 16 having threads 17 along at least a portion of the length thereof. These threads may be annular grooves or other forms of knurled surface and may connect to the head 15 through an intermediate section 18 which fits into the workpiece opening 23. The collar 11 is annular and is of a swageable material which, under pressure, will flow into the threads 17 of the lockbolt 12.

My fastener tool for the lockbolt 12 and the collar 11 includes, as its major components, the collet 20 and the collet housing 25. In addition, the tool includes a drawbar 21 and a chuck jaw assembly 22.

The housing 25 is annular and has a cylindrical opening 26 communicating with and axially aligned to a frusto conical opening 27 to extend through the housing 25. The frusto conical opening 27 is formed by inclined annular surface 28 which is inclined radially outward so that the largest cross sectional area of the opening 27 is at the end of the housing 25, FIG. 1.

The collet 20 has an outer shape similar to the opening of the housing 25, FIG. 2. In other words, a cylindrical section 29 connects with a frusto conical section 30. Sections 29 and 30, respectively, are dimensioned to freely move within openings 26 and 27, respectively, of housing 25. A counterbore 31 exists in the forward portion of the frusto conical section 30 and this counterbore 31 accommodates the collar 11, as will be described in detail hereinafter. Collet 20 also has a bore therethrough which includes cylindrical bore 32 communicating with a frusto conical bore 33 which, in turn, communicates with the counterbore 31, FIGS. 2 and 3. This frusto conical bore 33 is formed by an inwardly depending surface 34 which forms the cutting edge 24 for the lockbolt 12. The collet 20 is split into three sections by slots 44 which extend from the counterbored end of collet 20 to a point within the cylindrical section 29. Frusto conical section 30 of collet 20 is defined by annular wall 35 which is inclined at the same angle as the inner wall 28 of frusto conical opening 27 of housing 25. The height of frusto conical section 30 is greater than the height of frusto conical opening 27; in other words, inclined wall 35 is longer than inclined wall 28.

Drawbar 21 is also annular and fits into the cylindrical bore 32 of collet 20, FIG. 4. Drawbar 21 terminates at one end in an annular inclined wall 36 which inclination is the same as the inclination of the frusto conical bore 33 formed by the inwardly depending surface 34. Drawbar 21 has a central aperture 37 extending therethrough which has an enlarged intermediate aperture 38 terminating in a frusto conical aperture 39 formed by the inner surface of inclined wall 36. Cooperating with the frusto conical aperture 39 is cylindrical aperture 41 which accommodates the shank 16 of lockbolt 12.

Chuck jaws 22 fit within the intermediate section 38 of drawbar 21 and are of the standard type to grip the threaded shank 16 of lockbolt 12, FIG. 5. The forward end of chuck jaw 22 comprises inclined surface 42 which has the same inclination as the inner surface of wall 36. The rearward end (not shown) of drawbar 21 connects to a standard lockbolt gun such as the Cherry G–85D pneumatic hydraulic gun manufactured by the Cherry Rivet Division of Townsend Company. The lockbolt gun, the connection between the drawbar 21 and the gun and the details of the chuck jaws 22 are already within the knowledge of those skilled in the art and do not form a part of this invention.

My invention works as follows. The shank 16 of lockbolt 12 is inserted through openings 23 in panels 13 and 14 and the collar 11 is loosely positioned on the thread 17 of shank 16 so as to position the panels 13 and 14 between the collar and the enlarged head 15 of lockbolt 12. The tool is then placed over the collar 11 so that collar 11 is positioned in counterbore 31 of collet 20. Collar 11 rests against the rear surface of counterbore 31 and extends slightly beyond the end of collet 20. The shank 16 of lockbolt 12 extends through the cylindrical aperture 41 of the drawbar 21 and the chuck jaws 22 engage and grip threads 17 of shank 16. When the lockbolt gun, not shown, is activated, the drawbar 21 is moved in a rearward direction, as shown by arrow 43, FIG. 5.

The jaws 22 grip the threads 17 and the rearward movement thereof causes the collar 11 to firmly seat in the counterbore 31 which then creates tension between the enlarged head 15 of lockbolt 12 and the panels 13 and 14. This tension causes the collet 20 to retreat into housing 25 and places the collar 11, the panels 13 and 14 and the bolt head 15 in abutting engagement. As collet 20 retreats into housing 25, the inside diameter of the collet counterbore 31 becomes smaller because of the interaction of collet inclined surface 35 on housing inclined surface 28, FIG. 6. This is made possible by slots 44 which then decrease in size. As the inside diameter of the counterbore 31 becomes smaller, the counterbore engages the collar 11 with the resistance to deformation of the collar 11 being controlled by the collar hardness and the material mass. As this occurs, the counterbore 31 is completely filled with collar material and the cutting edge 24 engages the shank of the lockbolt 12 adjacent the collar 11, FIG. 6.

As the rearward movement of drawbar 21 continues, collet 20 continues to close and the excess metal in collar 11 is swaged into the threads 17 along the shank 16 of lockbolt 12. At the same time, the cutting edge 24 shears partially through the bolt shank 16 immediately rearward of collar 11. Due to the combination of tension and the fracture point caused by the cutting edge 24, the lockbolt 12 parts along the shank 16 directly behind the collar 11, FIG. 7.

Therefore, a single bolt length can accommodate varying thicknesses of workpieces and the tension required to produce a satisfactory fastening can be varied by merely changing the length of the cutting edge 24 or by changing the hardness of the collar 11 or the amount of material employed therefor.

I claim:

1. A crimp lock fastener tool for joining a swageable collar to a bolt having a threaded shank to secure workpieces therebetween comprising:
   A. a stationary housing having a cylindrical opening axially aligned and communicating with a frusto conical opening, the small base of which is diametrically constant and adjacent the cylindrical opening to form a passageway therethrough;
   B. a floating split collet freely positioned within said passageway, said collet having an outer surface shaped similar to said passageway, a counterbore at a forward end thereof to accommodate the swageable collar, a central bore therethrough communicating with said counterbore, said bore reduced in cross section by an inclined surface terminating in a cutting edge and extending between the counterbore and the aperture;
   C. chuck jaws having an inclined forward section and adapted to grippingly engage said bolt shank; and
   D. a drawbar extending into said central bore and having a forward sloped surface to slantingly engage the inclined forward section of the chuck jaws so that a tensile force on the drawbar causes a rearward movement of the drawbar which engages and rearwardly moves the chuck jaws and thereby the bolt, said frusto conical sections of the stationary housing and the outer surface of the collet interacting to rearwardly move the collet and to reduce the cross section of the counterbore causing the collar to be swaged onto the bolt shank and the cutting edge to penetrate the shank and shear it adjacent to the swaged collar.

2. The fastener tool of claim 1 including tension means connected to the drawbar to exert a tensile force and resultant rearward movement thereof.

3. The fastener tool of claim 1 wherein the split collet includes at least one slot in the outer surface, said slot extending from the forward end of the collet to a point substantially inward therefrom, said slot forming a segmented outer surface and permitting radially inward movement of said segments.

4. The fastener tool of claim 1 wherein the height of the frusto conical outer surface of the split collet is greater than the height of the frusto conical opening of the housing.

5. The fastener tool of claim 1 wherein the drawbar is annular shaped having a tripartite coaxial central aperture therethrough including an enlarged middle cylindrical aperture frusto conically terminating to accommodate the chuck jaws intermittent first and second cylindrical apertures, said first aperture accommodating the bolt shank.

* * * * *

UNITED STATES PATENT OFFICE
CERTIFICATE OF CORRECTION

Patent No. 3,698,231           Dated  October 17, 1972

Inventor(s)  SAMUEL B. DAVIS, JR.

It is certified that error appears in the above-identified patent and that said Letters Patent are hereby corrected as shown below:

On the cover sheet the assignee should read

-- Textron, Inc. --.

Signed and sealed this 1st day of May 1973.

(SEAL)
Attest:

EDWARD M. FLETCHER, JR.          ROBERT GOTTSCHALK
Attesting Officer                Commissioner of Patents